Oct. 15, 1957     L. M. GILBERTSON     2,809,608
RADIANT HEAT TYPE ELECTRIC BROODER

Filed March 4, 1955     3 Sheets-Sheet 1

INVENTOR
L. M. Gilbertson
BY John N. Randolph
ATTORNEY

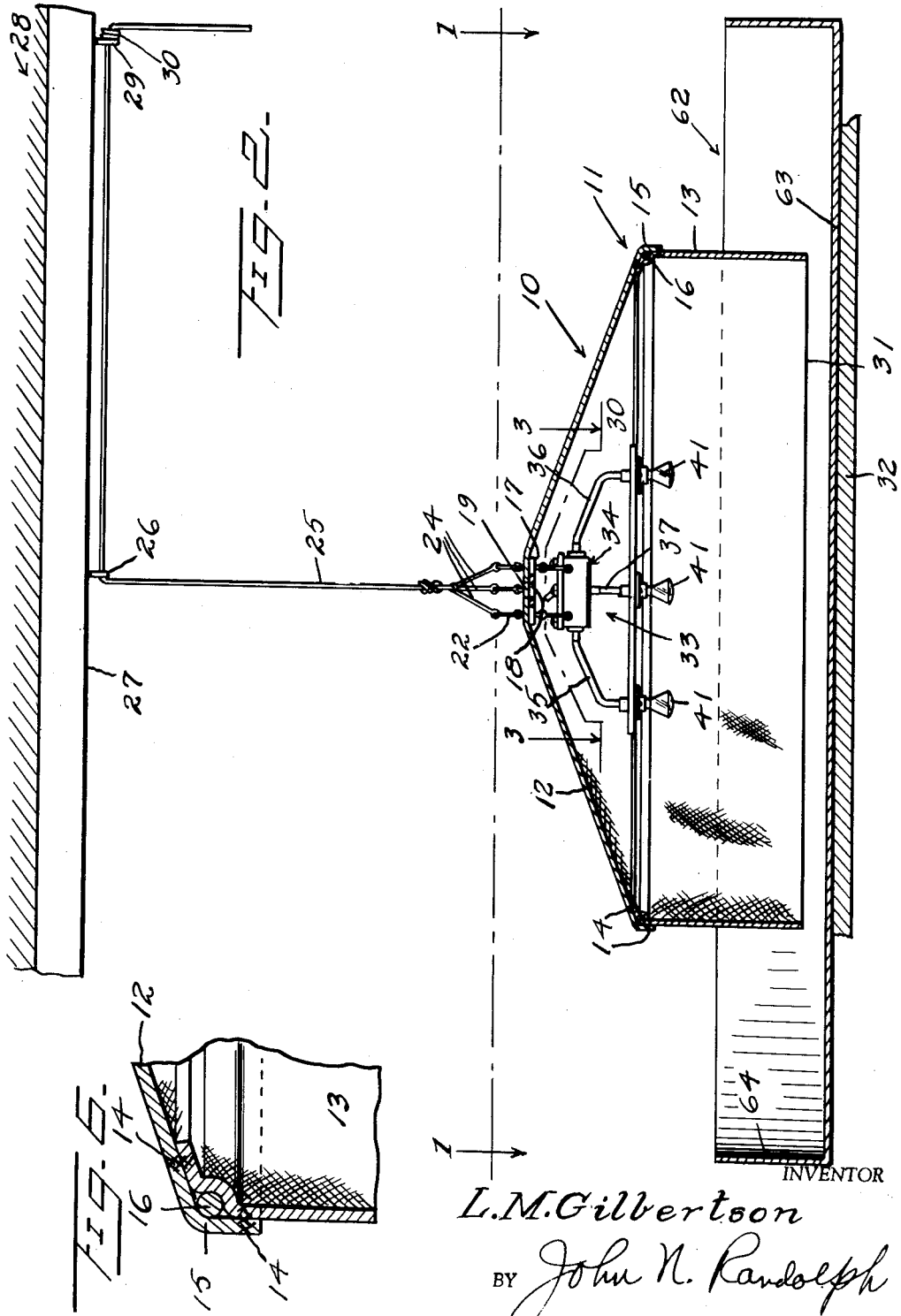

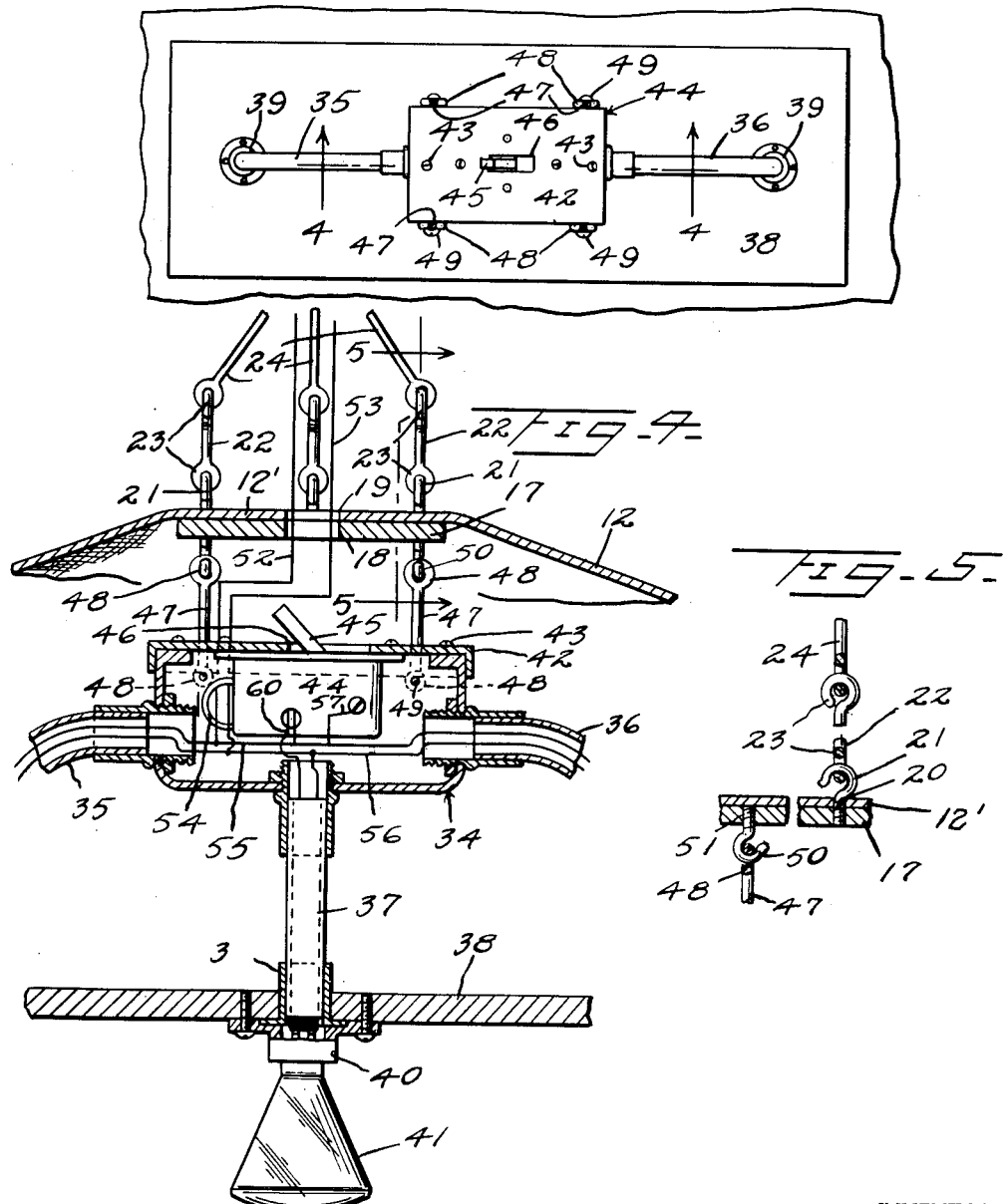

United States Patent Office 2,809,608
Patented Oct. 15, 1957

2,809,608

RADIANT HEAT TYPE ELECTRIC BROODER

Louis M. Gilbertson, Brasstown, N. C.

Application March 4, 1955, Serial No. 492,111

4 Claims. (Cl. 119—33)

This invention relates to a novel brooder primarily adapted for use in the raising of poultry, such as chickens, and which is likewise readily adapted for use as a brooder for the young of animals such as pigs and lambs.

More particularly, it is an aim of the invention to provide a brooder which is inexpensive to install, maintain and operate, which is extremely efficient, portable and light in weight and which can be conveniently stored when not in use.

A primary object of the present invention is to provide a brooder which will substantially eliminate condensation and thus maintain a dry litter, due to the fact that none of the exposed material thereof will collect condensation.

A further object of the invention is to provide a brooder which is suspended from above and which can be progressively raised to different heights as the brood thereof increases in age and size to thus vary the temperature of the brooder to conform to the proper temperature required for broods of different ages and also to provide additional space to accommodate the increased size of the individuals of the brood.

Another important object of the invention is to provide an improved construction of brooder wherein a substantially uniform temperature will be maintained throughout the entire brooder by a self-contained heating means thereof.

Various other objects and advantages of the invention will hereinafter become more fully apparent from the following description of the drawings, illustrating a presently preferred embodiment thereof, and wherein:

Figure 2 is an enlarged vertical sectional view, partly in elevation, taken substantially along a plane as indicated by the line 2—2 of Figure 1;

Figure 3 is an enlarged fragmentary horizontal sectional view, taken substantially along a plane as indicated by the line 3—3 of Figure 2;

Figure 4 is an enlarged fragmentary vertical sectional view, taken substantially along a plane as indicated by the line 4—4 of Figure 3;

Figure 5 is a fragmentary detail sectional view, taken substantially along a plane as indicated by the line 5—5 of Figure 4;

Figure 6 is an enlarged fragmentary detail sectional view, taken substantially along a plane as indicated by the line 6—6 of Figure 1.

Figure 1:
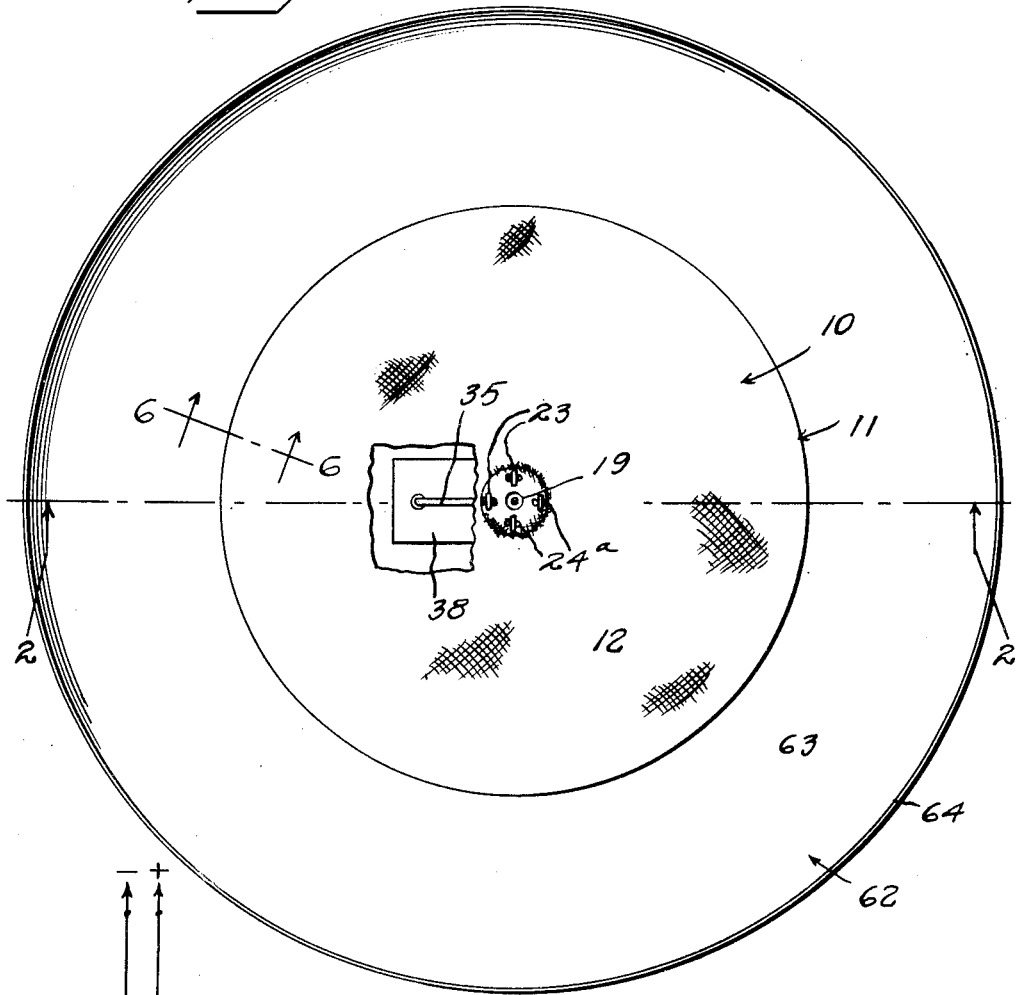
Figure 1 is a plan view, partly in horizontal section, taken substantially along a plane as indicated by the line 1—1 of Figure 2 and on a reduced scale relative to Figure 2.

Referring more specifically to the drawings, the brooder in its entirety and comprising the invention is designated generally 10 and includes an enclosure, designated generally 11, of circular shape and including a substantially conical canopy or roof 12 and a depending annular wall or apron 13. The parts 12 and 13 are each preferably formed from a single piece of untreated fabric such as duck or canvas. The peripheral portion of the canopy 12 overlaps the upper annular edge of the wall or apron 13 and said overlapping parts are secured together by two transversely spaced rows of stitching 14, as best seen in Figure 6 to provide a hem 15. A rigid hoop or ring 16, which may be formed of a heavy gauge wire or rod, is contained in the hem 15 between the rows of stitching 14 for holding the canopy 12 and wall or apron 13 extended, as illustrated in the drawings.

A disk 17, of a relatively small diameter as compared to the diameter of the enclosure 11, is disposed against the under or inner side of the central portion 12' of the canopy 12 and has a central opening 18 registering with a central opening 19 of the canopy 12. As best illustrated in Figures 4 and 5, the disk 17, which is preferably formed of wood, is connected to the canopy 12 by four equally spaced screws 20 which extend downwardly through the central portion 12' of the canopy 12 and are anchored in the disk 17 and which have hook shaped heads 21, which are disposed above the central portion 12' of the canopy 12. The hooks 21 are engaged by the lower ends of links 22 which are provided with eyes 23 at each end thereof. The upper eyes 23 of the four links 22 are connected to four flexible members or lines 24 which extend upwardly therefrom in converging relation to one another and the upper converging ends of which are connected to the lower end of a single line or flexible member 25. The line or flexible member 25 extends upwardly from the lines 24 through an eye or the like 26 which is secured in and depends from a ceiling or roof part 27 of a suitable enclosure or building 28, only a part of which is shown in Figure 1. The line 25 then extends horizontally of the eye 26 through another eye 29, which depends from the overhead enclosure part 27. The line 25 may be provided with a suitable stop 30 which abuts the eye 29 for supporting the open bottom 31 of the brooder enclosure 11 at a desired level above a floor of the enclosure 28, a part of which is shown at 32. The brooder 10 is thus supported from an overhead position by the line 25, the lines 24 and the links 22 which cooperate with one another and with the screw hooks 20, 21 and disk 17 to support the brooder enclosure 11 in substantially a horizontal position and with its open bottom 31 disposed above and parallel to the floor 32.

The brooder 10 also includes a heating unit, designated generally 33, including a junction box 34. Adjacent ends of three rigid metal tubular conduits 35, 36 and 37 are secured in and project from the junction box 34, as best seen in Figure 4, and have adjacent ends opening into said junction box. The opposite ends of the rigid conduits or tubes 35, 36 and 37 are disposed in alignment and are secured to an elongated plate 38 by connector sleeves 39, for supporting said plate 38 beneath and substantially parallel to the junction box 34. Electric lamp sockets 40 are secured to the underside of the plate 38 in registration with the tubes 35, 36 and 37. Said sockets 40 are preferably of the porcelain type and mount heat lamp bulbs 41 preferably of the infrared ray type, each of which is preferably of 250 wattage. Thus, the bulbs 41 are disposed in spaced apart relation to one another and are each disposed with the axis thereof depending vertically from the plate 38. The plate 38 is preferably formed of aluminum and the junction box 34 and tubes 35, 36 and 37 are also preferably formed of a lightweight metal of a type which will not readily collect condensation.

The junction box 34 has a removable top wall or cover 42 held in place thereon by suitable fastenings 43. A conventional toggle type electric switch 44 is mounted in the junction box 34 and is preferably fastened to the underside of the cover 42 and has an actuating lever 45 projecting outwardly through the slot 46 of said cover. The junction box and the parts suspended therefrom is supported by a plurality, preferably four, hanger rods 47 having eyes 48 at the ends thereof. The lower eyes 48 are secured by fastenings 49 to vertical walls of the junction box 34 and extend upwardly therefrom to above the cover 42. The lower eyes 48 may be of sufficient thickness to offset the hangers 47 from adjacent flanges of the cover 42. The upper eyes 48 engage hooks 50 which depend from the disk 17 and which have threaded shanks 51 which are anchored in said disk, as seen in Figure 5. Thus, the junction box 34 and plate 38 are supported beneath and substantially parallel to the disk 17.

Figure 7:
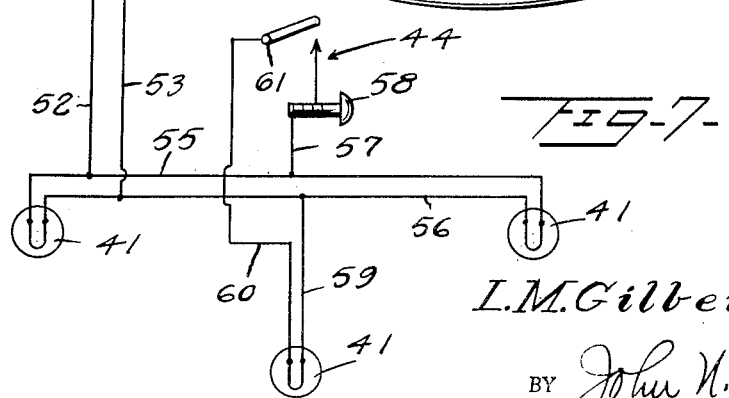
Figure 7 is a diagrammatic view of the electric circuit of the brooder.

An electric cord of conventional construction leading from a conventional electric outlet, not shown, of the enclosure 28 includes conductor wires 52 and 53 which extend downwardly through the aligned openings 19 and 18 and into the junction box 34 through a side wall opening 54 thereof. Within the box 34, the wires 52 and 53 connect with conductor wires 55 and 56, respectively, having end portions extending through the tubes 35 and 36 which are connected to the two end sockets 40 for supplying electric current to the two end bulbs 41. As best illustrated in Figures 4 and 7, the branch conductor wire 57 leads from the wire 55 to one post 58 of the switch 44. A conductor wire 59 leads from the wire 56 to one terminal of the intermediate socket 40 and a wire 60 extends from the other terminal of the intermediate socket 40 to the other post 61 of the switch 44.

The brooder enclosure 11 is preferably suspended in a conventional draft guard 62 including a substantially flat bottom 63 which rests on the floor 32 and an upstanding annular outer wall 64. Assuming that the brooder 10 is to contain newly hatched chicks, the suspending member 25 is adjusted so that the open bottom 31 will be disposed about two inches above the bottom 63 and substantially below the level of the upper edge of the wall 64. The brooder housing 11 is centered in the draft guard 62 and is of a diameter substantially less than the diameter of the draft guard, as seen in Figure 2. The brooder 10 may be made in various sizes and it is to be understood that a number of brooders will be contained in the enclosure 28. The two end bulbs 41 are maintained constantly energized while the brooder is in use and are spaced apart a distance preferably equal to approximately one-third the diameter of the enclosure 11 and are spaced from the open bottom 31 thereof a proper distance so that the area immediately beneath said open bottom 31 will be maintained at substantially a uniform temperature. If the capacity of the enclosure 28 is fully utilized, a sufficient number of brooders will be contained therein so that the heat and light supplied by the two end bulbs 41 of each brooder 10 will make it unnecessary to provide other heat or light for the enclosure 28. However, under very cold weather conditions where additional heat is required the switch 44 of each brooder 10 may be moved to a circuit closing position for energizing the intermediate heat lamp 41 thereof. When this is done, the brooder enclosure 11 is raised several inches to prevent overheating of the enclosure.

It will be readily apparent that the heat from the two end lamps 41 of each brooder 10 will be adequate to maintain the litter, not shown, within the draft guard 62, in a dry condition. The untreated fabric of which the enclosure 11 is formed will prevent accumulation of condensation, so that the brooder will be substantially condensation free.

As the brood increases in age and size so as to require more space and less heat, the enclosure 11 can be raised by the suspending member 25 and by adjustment of the abutment 30 to increase the spacing between the open bottom 31 thereof and the draft guard bottom 63. The initial two inch spacing is adequate to permit young chicks only a few days old to readily pass therebeneath. Thus, the brooder 10 can be gradually raised until the canopy 12 is located adjacent the ceiling 27 and the apron 13 may be rolled up or thrown back over the canopy 12 when not required, when the brooder is used for chickens four or five weeks old. The brooder may also be conveniently stored substantially against the ceiling 27 when not in use and with the apron 13 rolled or thrown back over the canopy 12 will occupy very little space below the ceiling.

Various modifications and changes are contemplated and may obviously be resorted to, without departing from the spirit or scope of the invention as hereinafter defined by the appended claims.

I claim as my invention:

1. A brooder of the character described comprising an enclosure including a substantially conical canopy of untreated cloth forming the top portion thereof and an annular side wall of untreated cloth secured to and depending from the periphery of said canopy and having a lower end defining the open bottom of the enclosure, suspension means adapted to be adjustably connected to and depending from an overhead support of a building, said suspension means having a lower portion connected to the center of the canopy for supporting the enclosure with the open bottom thereof disposed above and substantially parallel to a floor surface, and a heating and lighting means supported within said brooder enclosure by said suspension means, said canopy and side wall having overlapping edge portions secured together to form a hem, and a substantially rigid ring member disposed in said hem and cooperating with said suspension means for holding the canopy and side wall in extended positions.

2. A brooder as in claim 1, the lower portion of said suspension means including a disk of relatively small diameter as compared to the diameter of said brooder enclosure, said disk being disposed against the underside of the central portion of the canopy, a plurality of equally spaced fastenings extending through the canopy and anchored in said disk, said suspension means including a flexible member extending downwardly from the overhead support and having a plurality of branch portions at its lower end connected to said fastening means for supporting the open bottom of the brooder enclosure in substantially a horizontal plane.

3. A brooder as in claim 2, said light and heat source including a plurality of electrically energized heat lamps disposed in spaced apart relation to one another substantially above the open bottom of said brooder enclosure, and a junction box, hanger means suspending said junction box from the disk within the upper portion of said canopy, a supporting plate, a plurality of rigid tubular members extending between and connected to the junction box and supporting plate for supporting said plate beneath the junction box and substantially parallel to the open bottom of the brooder enclosure, lamp sockets mounted on the underside of said supporting plate in communication with said tubular members and in which the lamp bulbs are supported, an electrical conductor means through which electric current is adapted to be supplied to the lamp sockets having portions extending through said tubular members and junction box, and said canopy and disk having registering openings through which said electrical conductor means extends into the brooder enclosure.

4. A brooder of the character described comprising an untreated fabric brooder enclosure including a conical top portion forming a canopy and a depending annular side wall having a lower end defining the open bottom of said enclosure, said canopy and side wall being joined together by an annular hem, a rigid ring member disposed in said hem and maintaining the enclosure in an extended position, suspension means adapted to be connected to and suspended from an overhead support, said suspension means having branch portions defining the lower end thereof, a rigid disk disposed against an underside of a central portion of said canopy and secured to said branch portions of the suspension means for suspending the brooder enclosure with the open bottom thereof in substantially a horizontal plane, and means constituting a heating and light source connected to said disk and suspended thereby in a centered position therebeneath and within the canopy.

References Cited in the file of this patent

UNITED STATES PATENTS

| | | |
|---|---|---|
| 1,798,395 | Bartlett | Mar. 31, 1931 |
| 1,842,672 | Hunter | Jan. 26, 1932 |
| 2,123,671 | Du Bois | July 12, 1938 |
| 2,287,635 | Nolte | June 23, 1942 |
| 2,546,536 | Berg | Mar. 27, 1951 |
| 2,604,875 | Klay | July 29, 1952 |